United States Patent
Huffer et al.

(10) Patent No.: US 10,407,230 B2
(45) Date of Patent: Sep. 10, 2019

(54) RE-SEALABLE FLEXIBLE PACKAGE WITH REINFORCED PERIMETER

(71) Applicant: SONOCO DEVELOPMENT, INC., Hartsville, SC (US)

(72) Inventors: Scott William Huffer, Hartsville, SC (US); Sharayla Ann Cleare, Florence, SC (US)

(73) Assignee: SONOCO DEVELOPMENT, INC., Hartsville, SC (US)

( * ) Notice: Subject to any disclaimer, the term of this patent is extended or adjusted under 35 U.S.C. 154(b) by 2 days.

(21) Appl. No.: 15/915,802

(22) Filed: Mar. 8, 2018

(65) Prior Publication Data

US 2018/0194529 A1 Jul. 12, 2018

Related U.S. Application Data (62) Division of application No. 14/563,132, filed on Dec. 8, 2014, now Pat. No. 9,944,446.

(51) Int. Cl.
*B65D 77/20* (2006.01)
*B29C 65/76* (2006.01)
*B29C 65/48* (2006.01)

(52) U.S. Cl.
CPC ...... *B65D 77/2096* (2013.01); *B29C 65/4825* (2013.01); *B29C 65/76* (2013.01);
(Continued)

(58) Field of Classification Search
CPC ............ B65D 77/2096; B65D 77/2044; B29C 65/76; B29C 65/4825; B32B 7/06
See application file for complete search history.

(56) References Cited

U.S. PATENT DOCUMENTS

RE27,361 E    5/1972 Miller
4,381,848 A   5/1983 Kahn
(Continued)

FOREIGN PATENT DOCUMENTS

EP          1052186 A2       11/2000
WO    WO 2009/111153 A1      9/2009
WO    WO 2013/11409 A1       8/2013

OTHER PUBLICATIONS

International Search Report and Written Opinion for Application No. PCT/IB2015/059444 dated Feb. 11, 2016.
(Continued)

*Primary Examiner* — Jeffrey R Allen
*Assistant Examiner* — Jennifer Castriotta
(74) *Attorney, Agent, or Firm* — Nelson, Mullins Riley & Scarborough LLP (57) ABSTRACT

Improved packages and methods for constructing packages are provided that reduce or prevent leakage into or out of the package. In particular, the package includes a base member and a lidding member with a reinforced perimeter portion that blocks channels that may form at the interface between the base member and the lidding member from extending to the edge of the base member, such that, e.g., liquids have no path to the package exterior. The perimeter portion may be a thicker region of a first film of the lidding member (e.g., a polyethylene emulsion), or the perimeter portion may be formed using permanent adhesive. Frangible layers and/or cut lines may be defined in the material of the base member or the lidding member to allow a controlled break to occur when the lidding member is peeled away from the base member to provide access to the package contents.

24 Claims, 8 Drawing Sheets

(52) U.S. Cl.
CPC .... *B65D 77/2044* (2013.01); *B65D 2577/205* (2013.01); *B65D 2577/2091* (2013.01)

(56) References Cited

U.S. PATENT DOCUMENTS

| | | |
|---|---|---|
| 4,673,601 A | 6/1987 | Lamping et al. |
| 5,145,737 A | 9/1992 | Boiron et al. |
| 6,056,141 A | 5/2000 | Navarini et al. |
| 7,314,669 B2 | 1/2008 | Galloway |
| 7,422,782 B2 | 9/2008 | Haedt et al. |
| 8,541,081 B1 | 9/2013 | Ranganathan et al. |
| 8,617,677 B2 | 12/2013 | Trouilhet et al. |
| 8,727,621 B2 | 5/2014 | Owensby et al. |
| 8,746,490 B2 | 6/2014 | Huffer et al. |
| 8,800,250 B2 | 8/2014 | Moehlenbrock |
| 8,807,834 B2 | 8/2014 | Owensby et al. |
| 2002/0197425 A1 | 12/2002 | Wolf et al. |
| 2004/0151932 A1 | 8/2004 | Galloway |
| 2008/0063821 A1 | 3/2008 | Galloway |
| 2012/0207408 A1 | 8/2012 | Moehlenbrock et al. |
| 2012/0207410 A1 | 8/2012 | Moehlenbrock |
| 2012/0207412 A1 | 8/2012 | Moehlenbrock et al. |
| 2012/0321886 A1 | 12/2012 | Tobing et al. |
| 2013/0020328 A1 | 1/2013 | Duan et al. |
| 2015/0158643 A1 | 6/2015 | Coker et al. |
| 2016/0031619 A1 | 2/2016 | Coker et al. |

OTHER PUBLICATIONS

Office Action for corresponding Canadian Application No. 2970073 dated Mar. 15, 2018, all pages enclosed.

FIG. 15

RE-SEALABLE FLEXIBLE PACKAGE WITH REINFORCED PERIMETER

CROSS-REFERENCE TO RELATED APPLICATIONS

This application is a divisional of U.S. patent application Ser. No. 14/563,132 filed Dec. 8, 2014, entitled "Re-Sealable Flexible Package With Reinforced Perimeter," which is incorporated by reference herein in its entirety.

BACKGROUND

The present disclosure relates in general to packaging for products, and more particularly to packaging constructed from flexible film-based materials. The disclosure is especially concerned with packages that include a base member and a lidding member, where the lidding member includes features for preventing or minimizing leakage of the contents of the package.

Flexible film-based materials can be used to construct packages for products. Such a package can include a base member, such as a rigid plastic tub or tray, composite can, or other container, and a lidding member made of a multi-layer flexible film laminate that can be peeled off the base member to provide access to the contents of the package (e.g., meat, cheese, etc.). In some cases, the peelable portion may be designed to be re-adhered to the rest of the package to provide a reclosing feature for storing unused contents of an opened package. Often, the contents of the package may include a liquid component, such as juices, oils, or other liquids.

BRIEF SUMMARY

Embodiments of the invention described herein provide improved packages and methods for constructing packages that reduce or prevent leakage of the liquid component of the contents to the package exterior. In particular, embodiments of the invention include a reinforced perimeter portion that blocks channels that may form at an adhesive interface (e.g., between the base member and the lidding member) and prevents them from extending to the edge of the base member, such that liquids contained in the package have no path to the package exterior.

Accordingly, in some embodiments, a flexible package is provided that comprises a base member and a lidding member. The base member may define a cavity configured to receive an item therein, and the base member may comprise a flange, where the flange defines an exterior edge. The lidding member may be configured to be attached to the base member to cover the cavity and maintain the item within the base member. The lidding member may be configured to be peeled away from the base member to provide access to the cavity and may be configured to be re-sealed to the base member.

The lidding member may comprise a first layer configured to engage the flange of the base member and extending at least to the exterior edge of the flange, as well as a second layer laminated to the first layer via an adhesive layer. The adhesive layer may comprise a pressure sensitive adhesive that is configured to separate from the first layer when at least a portion of the lidding member is peeled away from the base member. The lidding member may further comprise a perimeter portion adjacent an outer edge of the pressure sensitive adhesive, such that the pressure sensitive adhesive is spaced inwardly from the exterior edge of the flange by the perimeter portion.

In some cases, the perimeter portion is may be defined by the first layer. The lidding member may comprise a cut line between the pressure sensitive adhesive and the perimeter portion, and the cut line may extend at least partially through a thickness of the first layer towards the base member, such that the lidding member separates from the base member at an interface disposed between the first layer and the base member on an outward side of the cut line and at an interface disposed between the pressure sensitive adhesive and the first layer at an inward side of the cut line. In other embodiments, the lidding member may comprise a cut line between the pressure sensitive adhesive and the perimeter portion, and the cut line may extend at least partially through a thickness of the first layer towards the base member, such that the lidding member separates from the base member at an interface disposed between the first layer and the base member on an outward side of the cut line and at an interface disposed between the pressure sensitive adhesive and the first layer at an inward side of the cut line. Moreover, the first layer and the perimeter portion may extend outwardly past the outward edge of the flange of the base member and may define a break tab.

In other cases, the perimeter portion may comprise permanent adhesive. A frangible layer may be disposed between the adhesive layer and the first layer. The lidding member may, in some cases, comprise a cut line extending through a thickness of the first layer outwardly of the outer edge of the flange so as to define a break tab. The package may further comprise a frangible layer between the first layer and the flange of the base member. The lidding member may comprise a cut line extending through a thickness of the first layer in a location corresponding to an interface between the pressure sensitive adhesive and the perimeter portion, and the cut line may extend at least partially through a thickness of the first layer between the base member and the adhesive layer, such that the lidding member is separable from the base member at the frangible layer on an outward side of the cut line and at an interface disposed between the pressure sensitive adhesive and the first layer at an inward side of the cut line.

The lidding member, in some cases, may further comprise an ink layer disposed on an inner surface of the second layer between the adhesive layer and the second layer. Additionally or alternatively, the second layer of the lidding member may comprise a barrier material.

In still other embodiments, a method of manufacturing a flexible package is provided. According to the method, a base member may be formed having a cavity configured to receive an item therein and a flange, wherein the flange defines an exterior edge. A first layer of material may be laminated to a second layer of material to form a lidding member by applying a pressure sensitive adhesive between the first and the second layers, and creating a perimeter portion between the first and second layers that is disposed adjacent to an outer edge of the pressure sensitive adhesive. In this way, the pressure sensitive adhesive may be spaced inwardly from the exterior edge of the flange. The lidding member may be attached to the base member at a location corresponding to the perimeter portion, such that the lidding member covers the cavity and maintains the item within the base member. At least a portion of the lidding member may be configured to be peeled away from the base member to provide access to the cavity and may further be configured to be re-sealed to the base member via the pressure sensitive adhesive.

In some cases, a cut line may be created through a thickness of at least the first layer prior to attaching the lidding member to the base member, where the cut line defines a break tab outwardly of the cut line that is grippable by a user for peeling the lidding member away from the base member to provide access to the cavity. Creating the perimeter portion may comprise forming a region of increased thickness using the polyethylene emulsion of the first layer. Creating the cut line may comprise creating the cut line between the pressure sensitive adhesive and the perimeter portion, such that the lidding member separates from the base member at an interface disposed between the first layer and the base member on an outward side of the cut line and at an interface disposed between the pressure sensitive adhesive and the first layer at an inward side of the cut line.

In other cases, creating the perimeter portion may comprise applying permanent adhesive to a perimetral region of the first layer such that the permanent adhesive is disposed adjacent to the outer edge of the pressure sensitive adhesive. A frangible layer may be created between the adhesive layer and the first layer, where the cut line extends through a thickness of the first layer outwardly of the exterior edge of the flange so as to define the break tab. In other embodiments, a frangible layer may be created between the first layer and the flange of the base member, where the cut line extends through a thickness of the first layer in a location corresponding to an interface between the pressure sensitive adhesive and the perimeter portion, such that the lidding member is separable from the base member at the frangible layer on an outward side of the cut line and at an interface disposed between the pressure sensitive adhesive and the first layer at an inward side of the cut line.

In some embodiments, an ink layer may be applied on an inner surface of the second layer between the pressure sensitive adhesive and the second layer. Additionally or alternatively, the lidding member may be heat sealed to the base member in a location corresponding to the perimeter portion.

BRIEF DESCRIPTION OF THE SEVERAL VIEWS OF THE DRAWING(S)

Having thus described the disclosure in general terms, reference will now be made to the accompanying drawings, which are not necessarily drawn to scale, and wherein:

DETAILED DESCRIPTION OF THE DRAWINGS

The present invention now will be described more fully hereinafter with reference to the accompanying drawings in which some but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

As noted above, and with reference to FIGS. 1 and 2, some packages for holding food items (e.g., refrigerated meats and cheeses) include a base member 10 and a lidding member 20 that is attached to the base member and is configured to be peeled away from the base member (as shown in FIG. 2) to provide access to a cavity 30 in which the package contents are stored. The lidding member 20 may, for example, be secured to the base member 10 (at least in some locations) by a layer of pressure sensitive adhesive (PSA), such that in some embodiments the lidding member 20 may be re-adhered to the base member 10 by moving the lidding member back into contact with the base member.

Figures 3, 4, 5, 6:
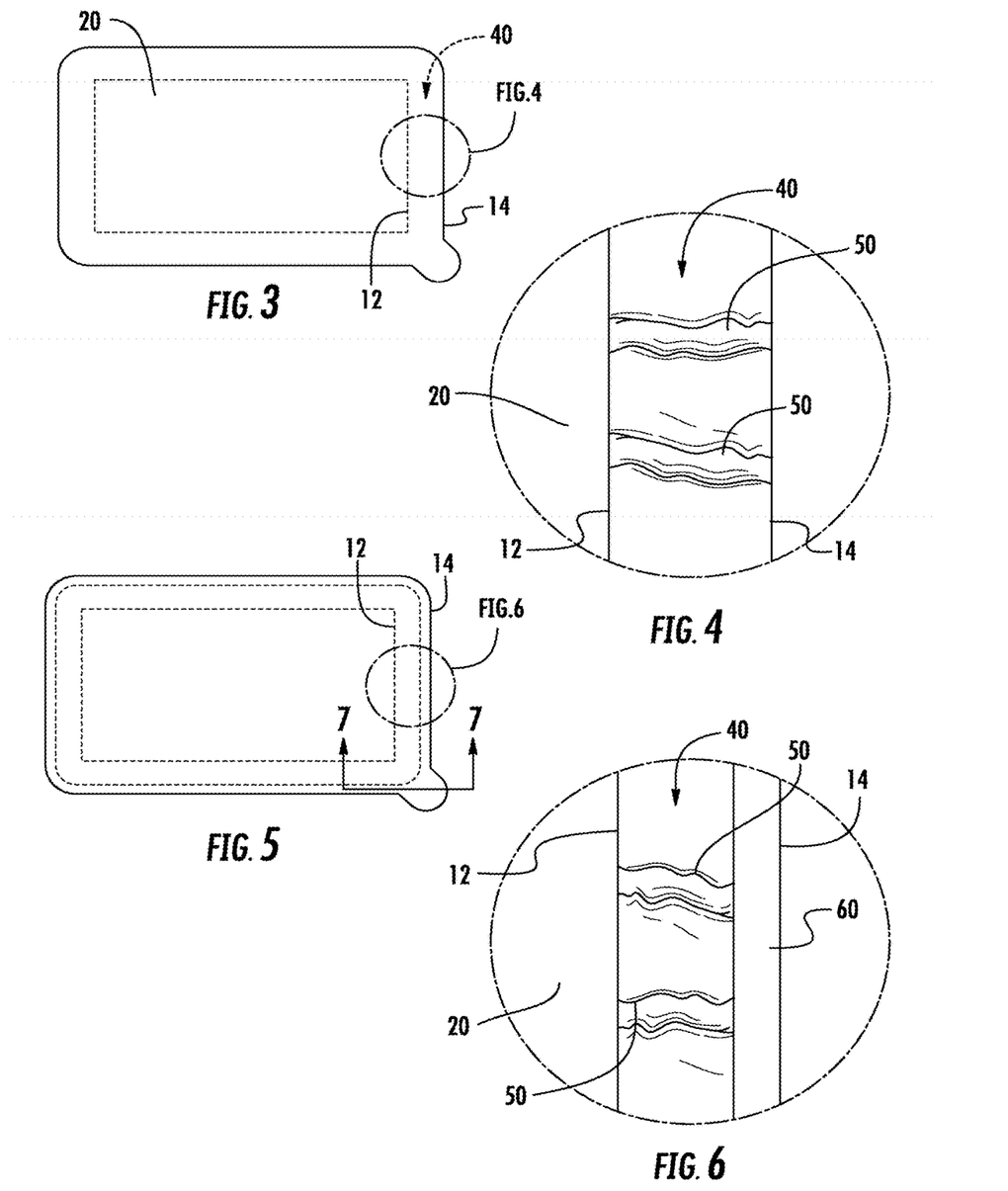
FIG. 3 is a top view of a conventional package.
FIG. 4 is a close up view of the conventional package of FIG. 3 showing channels extending from an interior edge of the flange to an exterior edge of the flange of the package.
FIG. 5 is a top view of a lidding member of a package with a reinforced perimeter portion according to an example embodiment.
FIG. 6 is a close up view of the package of FIG. 5 showing the reinforced perimeter portion blocking the channels from extending from the interior edge of the flange to the exterior edge of the flange of the package according to an example embodiment.

In conventional packages having PSA 40 at an interface between the lidding member 20 and the base member 10, the PSA is applied to the lidding member 20 such that the PSA extends between an interior edge 12 of the base member and an exterior edge 14 of the base member when the package is closed, as shown in the top view depicted in FIG. 3. When such conventional packages are in a refrigerated environment, it has been observed by the inventors that stresses are created at the interface between the base member 10 and the lidding member 20, which can create channels 50 in the PSA 40 (e.g., between the PSA and the base member), as illustrated in FIG. 4. For example, cut lines made in the lidding member to facilitate opening of the package and/or re-sealing and tamper evident features can facilitate formation of channels by creating areas of localized stresses. When such channels 50 extend from the interior edge 12 of the base member 10 to the exterior edge 14 of the base member, as depicted in FIG. 4, liquids contained in the cavity 30 can escape to the package exterior via the channels 50, causing leaks and compromising the aesthetics, cleanliness, integrity, hermaticity, and/or overall appeal of the package to a potential consumer.

Through ingenuity and hard work, the inventors have developed a re-sealable flexible package that includes a reinforced perimeter portion 60 of the lidding member 20 that acts as a blockade or barrier to such channels 50, such that even if such channels form, the channels 50 are prevented from extending to the exterior edge 14 of the base member, as shown in FIGS. 5 and 6. As a result, liquids stored inside the package do not have a path to reach the package exterior and are thus contained within the package, despite the formation of the channels 50. Similarly, oxygen, moisture, and other things that may be present in the environment of the package do not have a path to enter into and compromise the contents of the package.

Figure 1:
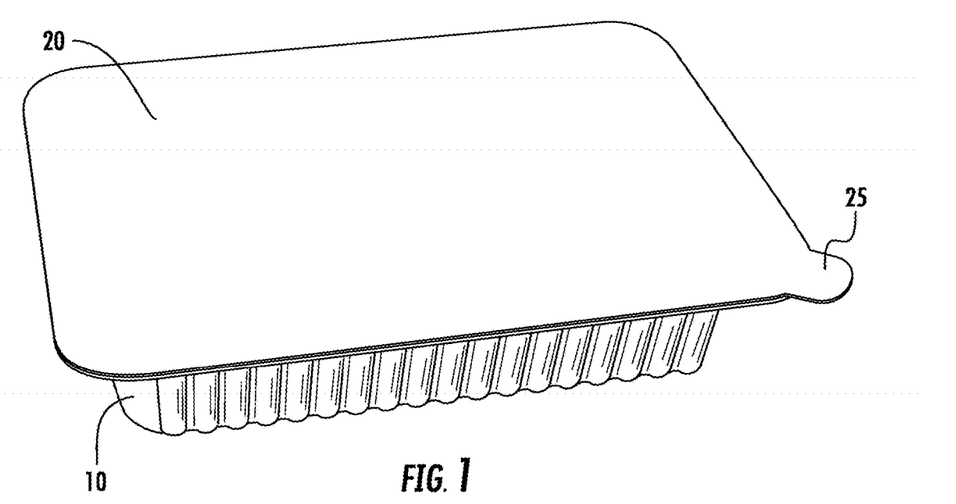
FIG. 1 is a perspective view of a package with a base member and a lidding member in the closed position.
Figure 2:
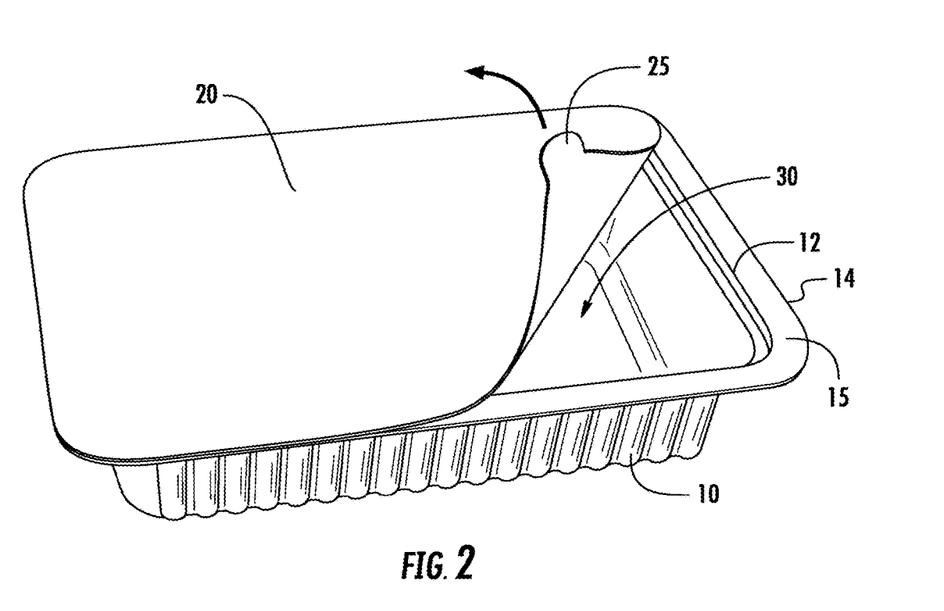
FIG. 2 is a perspective view of the package of FIG. 1 in a partially open position.

Various structures and methods of providing the perimeter portion 60 are contemplated, based on the types of materials used for the base member 10 and/or the lidding member 20, the environment the package is designed to withstand (e.g., refrigerated or room temperature), different processes the package will undergo (e.g., retort), and the type of seal used to secure the lidding member 20 to the base member 10 (e.g., heat seal or compressible seal). Regardless of the particular materials or construction of the perimeter portion 60, however, embodiments of the invention described below with reference to FIGS. 7-15 provide a flexible package that includes a base member 10 that defines a cavity 30 configured to receive an item or product therein, as shown in FIGS. 1 and 2 (where the item stored within the cavity is not shown for clarity of the explanation). The base member 10 may include a flange 15 (e.g., an outwardly extending flange of a tray or tub as shown in FIGS. 7-12 or a bead or rim of a composite can or cylindrical container as shown in FIGS. 13A-15), and the flange may define an exterior edge 14.

The package may further include a lidding member 20 that is configured to be attached to the base member 10 to cover the cavity 30 and maintain the item within the base member. The lidding member 20 may be configured to be peeled away from the base member 10 to provide access to the cavity 30 and may be configured to be re-sealed to the base member 10 in some cases.

As described in greater detail below with respect to each embodiment, the lidding member 20 may comprise a first layer 70 that is configured to engage the flange 15 of the base member 10 and that extends at least to the exterior edge 14 of the flange. In some cases, as shown in FIGS. 7-13B, for example, at least a portion of the first layer may extend past (e.g., farther outward of) the exterior edge 14 of the flange 15, such as when the lidding member 20 forms a break tab 25 configured to be gripped by the user to facilitate peeling of the lidding member 20 away from the base member 10.

The lidding member 20 may further comprise a second layer 80 that is laminated to the first layer 70 via an adhesive layer 45. The adhesive layer 45 may include one or more adhesive portions, including, for example, a PSA portion 40 and/or another adhesive portion that is configured to separate from the first layer 70 when the lidding member 20 is peeled away from the base member 10. Other portions of the adhesive layer 45 (e.g., portions configured to maintain the first layer 70 laminated to the second layer 80) may include a permanent adhesive portion 41. The adhesive portions (e.g., the PSA portion 40 and the permanent adhesive portion 41) may, in some cases, be created via pattern printing. Cut lines 23 may be provided to allow portions of the first layer 70 to be lifted up with the lidding member 20 and other portions 71 to remain with the base member 10, as described in greater detail below.

In some embodiments, such as those depicted in FIGS. 7-15, the lidding member 20 may also comprise an ink layer 90 disposed on an inner surface 82 of the second layer 80, between the adhesive layer 45 and the second layer 80. The ink layer 90 may, for example, include colors, designs, and/or printed indicia that can be viewed by a consumer through the second layer 80, such as to provide information on the item contained inside the package and/or to make the package more desirable for purchase by a potential consumer. The PSA portion 40 of the adhesive layer 45 may have a propensity to remain with the ink layer 90 due to the chemical properties of each, such that when the lidding member 20 is peeled away from the base member 10, the PSA has a tendency to stay with the lidding member rather than with the portions 71 of the first layer 70 that remain attached to the base member 10, as described below.

Finally, as described in greater detail below with respect to each particular embodiment, the lidding member 20 may further comprise a perimeter portion 60 that is adjacent to an outer edge 48 of the PSA portion 40 (e.g., in abutting contact with the PSA or separated from the PSA by a cut line), such that the PSA is spaced inwardly from the exterior edge 14 of the flange 15 by the perimeter portion 60.

Figure 7:
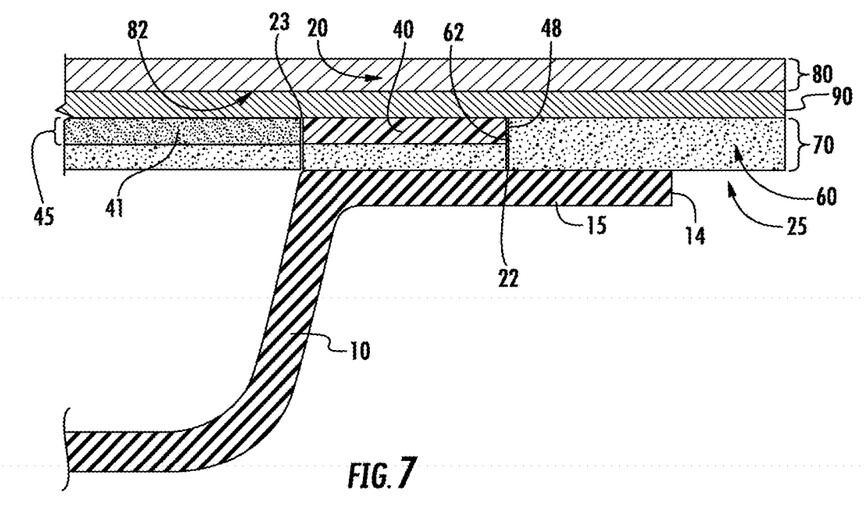
FIG. 7 is a partial schematic cross-sectional view of a lidding member with a reinforced perimeter and a base member in a closed position according to an example embodiment.
Figure 8:
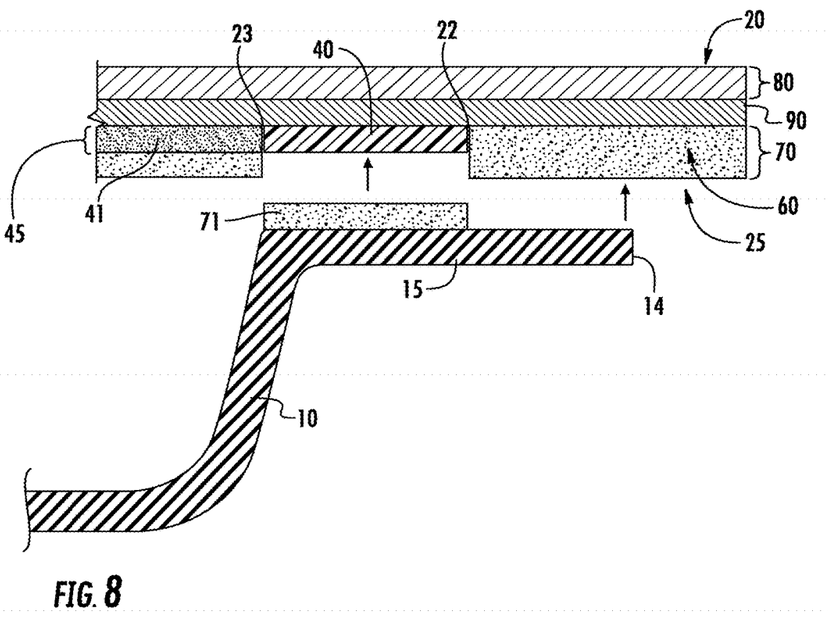
FIG. 8 is a partial schematic cross-sectional view of the lidding member with the reinforced perimeter and the base member of FIG. 7 in an open position according to an example embodiment.

In one embodiment, shown in FIGS. 7 and 8, for example, the base member 10 may be formed of a low density polyethylene (LDPE) material, a high impact polystyrene (HIPS) material, or other compatible material, and the perimeter portion 60 may be made of a polyethylene (PE) emulsion. In particular, the first layer 70 of the lidding member 20 may comprise the PE emulsion, and the perimeter portion 60 may be defined by the first layer 70. The second layer 80 may comprise polyethylene terephthalate (PET) or one or more barrier films in some embodiments. An ink layer 90 may be printed on an inner surface 82 of the second layer 80, between the adhesive layer 45 and the second layer 80.

Thus, as depicted in FIGS. 7 and 8, the PE material of the first layer 70 may be thicker (e.g., in a direction away from the flange 15) in the area of the perimeter portion 60 than in the area between the flange 15 and the PSA portion 40, such that an inner edge 62 of the perimeter portion 60 is adjacent the outer edge 48 of the PSA portion 40. Accordingly, as described above, the adjacency of the PE material in the perimeter portion 60 with respect to the outer edge 48 of the PSA portion 40 of the adhesive layer 45 can prevent any channels that form between the PSA and the underlying PE of the first layer 70 from extending outwardly of the outer edge 48, thereby keeping any leaks from reaching the exterior edge 14 of the base member 10.

The lidding member 20 may be affixed to the base member 10 by heat sealing along the perimetral edge of the lidding member/base member interface, e.g., in a location corresponding to a location of the perimeter portion 60. Accordingly, the package of FIGS. 7 and 8 may be opened by a user by creating a failure or breakage within the PE material of the first layer. For example, the force of a user pulling upward (with respect to the depicted embodiment of FIGS. 7 and 8) on the lidding member 20 may cause the first layer 70 to fracture at an interface of the first layer with the ink layer 90 and/or the second layer 80. In other cases, the fracture may occur between the first layer 70 and the flange 15.

In some embodiments, as shown in FIGS. 7 and 8, the lidding member 20 may comprise a cut line 22 between the PSA portion 40 and the perimeter portion 60. To facilitate opening of the package in this cut line 22 may, for example, extend at least partially through a thickness of the first layer 70, between the ink layer 90/the second layer 80 and the base member 10, such that the lidding member 20 separates from the base member 10 at an interface disposed between the first layer 70 and the base member 10 on an outward side of the cut line 22 and at an interface disposed between the PSA and the first layer at an inward side of the cut line, as shown in FIG. 8. In this regard, an inward portion 71 of the first layer 70 may remain attached to the flange 15 of the base member 10, whereas the PSA portion 40 and the portion of the first layer 70 corresponding to the perimeter portion 60 may remain with the lidding member 20. Accordingly, the lidding member 20 may be re-sealable to the base member 10 upon re-application of the lidding member to the flange 15 of the base member to bring the PSA portion 40 back into contact with the corresponding inward portion 71 of the first layer 70.

With respect to this and other embodiments described herein, as used herein, the term cut line refers to a cut line that may be a cut that is mechanically formed (e.g., a die cut made by a blade), made by a laser (such as a laser score line), or made in any other suitable manner. In still other cases, the cut line may be a line of weakness, such as a cut that does not go completely through respective layer of material, or a series of perforations. In some embodiment, such as the embodiments described herein, the cut line may be a rear cut line (e.g., a cut line that is formed on one side of the lidding member 20 only, such as the side that is later attached to the base member 10). By forming a cut line in this manner (e.g., on the first layer side of the lidding member), one or more barrier films may be used as the second layer 80, and one or more barrier films may be used as the second layer, where such barrier films would remain intact and untouched by the rear cut lines, thereby increasing the structural integrity of the package.

Moreover, additional cut lines 23 may be provided inward of the cut line 22 to ensure that other portions of the first layer, e.g., are peeled away from the base member 10 when the lidding member 20 is removed, as described above. In this way, portions of the first layer overlaying the cavity 30 may be moved away from the base member 10 to allow a user to access the cavity and its contents. For example, as noted above portions of the first layer 70 may be adhered to the second layer 80 (and/or the ink layer 90) via permanent adhesive 41 in a location corresponding to the location of the cavity 30, and additional cut lines 23 may be provided along an outermost perimeter of the permanent adhesive 41 to allow that portion of the first layer to be peeled away from the cavity 30.

Regardless of how it they are formed, the cut lines 22, 23 may be configured (e.g., sized and shaped) to facilitate a user's opening of the package (e.g., via peeling of the lidding member 20 from the base member 10). For example, the cut line 22 may be positioned so as to provide a break tab 25 on the lidding member 20 to allow the user to more easily grip the lidding member material and peel the lidding member away from the base member 10. For example, in some embodiments as shown in FIGS. 7 and 8, the first layer 70 and the perimeter portion 60 may extend outwardly past the exterior edge 14 of the flange 15 of the base member 10 and may define the break tab 25. Thus, the undercut formed between the first layer 70 and the flange 15 may provide an access area for the consumer to grip the lidding member 20 and peel it away from the base member 10.

Although in the embodiment described above and shown in FIGS. 7 and 8 the perimeter portion 60 is defined by a thicker portion of the first layer 70, the perimeter portion 60 in other embodiments may be made of a different material and may be distinct from the first layer 70. For example, in the embodiment illustrated in FIGS. 9 and 10, the perimeter portion 60 comprises permanent adhesive. The base member 10 may, in such embodiments, comprise polypropylene (PP), and the lidding member 20 may, in turn, also comprise a form of PP to facilitate sealing of the lidding member 20 to the flange 15 of the base member 10 (e.g., via heat sealing as described above). For example, the lidding member 20 may comprise cast polypropylene (CPP), oriented polypropylene (OPP), or metalized oriented polypropylene (mOPP), among other materials. The second layer 80 may comprise polyethylene terephthalate (PET) or one or more barrier films in some embodiments. An ink layer 90 may also be provided between the adhesive layer 45 and the second layer 80, as described above.

To facilitate a controlled separation of the lidding member 20 from the base member 10, a frangible layer 75, which may be a weakened skin layer of the base member 10 or of the first layer 70 of the lidding member 20, may be provided. The frangible layer 75 may, in some cases, be a skin layer that is disposed on a coextrudeable sealant film or a weakened heat seal coating disposed in the heat seal area of the package, on the first layer 70 or the material forming the base member 10, such as a coating or sealant applied to the material that is configured to allow the first layer 70 to be separated from the adhesive layer 45 (e.g., at the permanent adhesive portions 41 of the adhesive layer 45). The frangible layer 75 may, e.g., include a contaminant material, such as Butene Copolymer or polyButylene to create a weakened layer of material.

Figure 9:
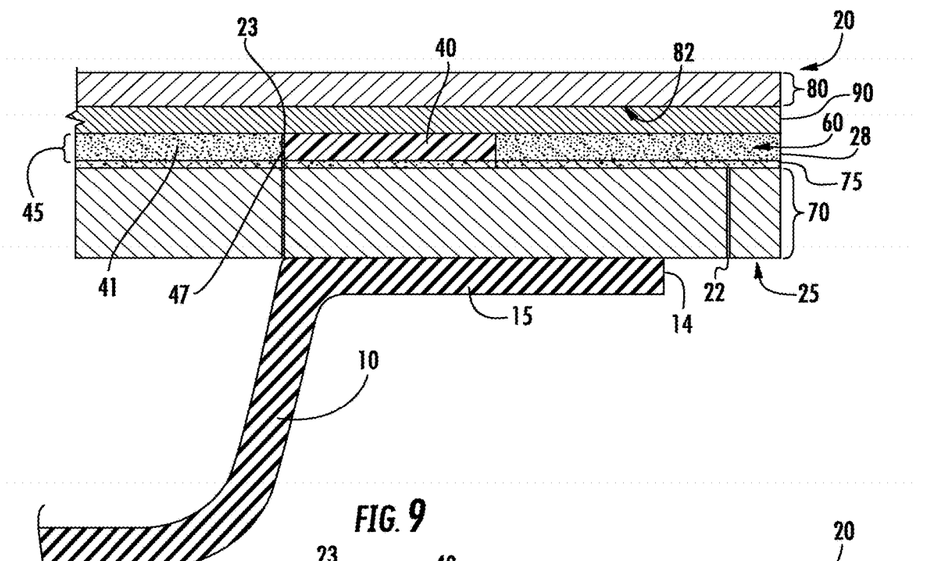
FIG. 9 is a partial schematic cross-sectional view of a lidding member with a reinforced perimeter and a base member in a closed position according to another example embodiment.
Figure 10:
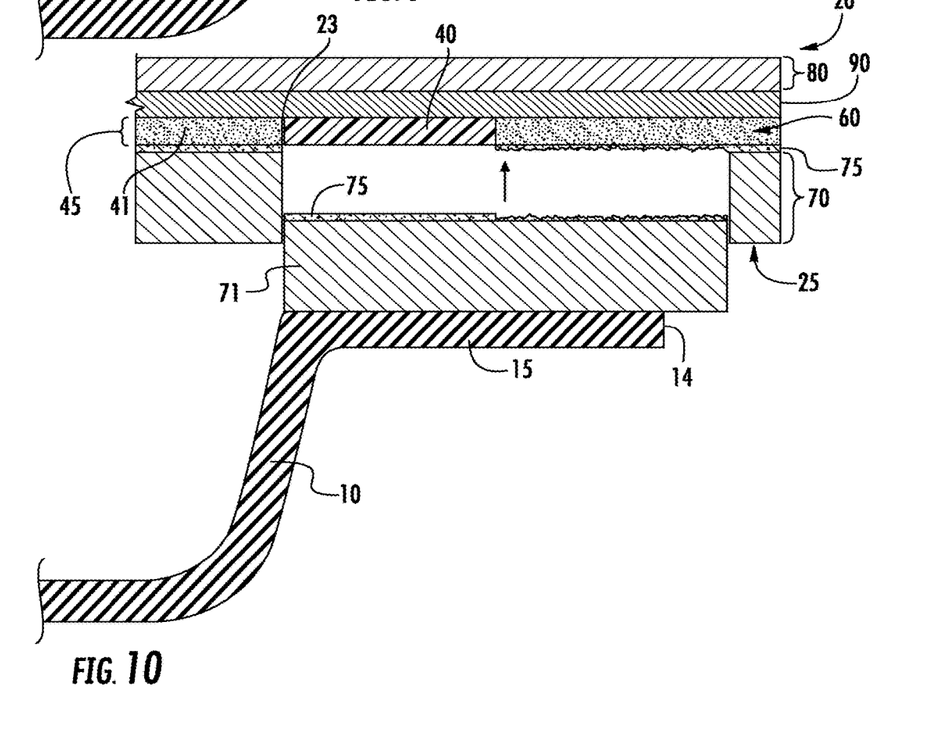
FIG. 10 is a partial schematic cross-sectional view of the lidding member with the reinforced perimeter and the base member of FIG. 9 in an open position according to an example embodiment.

In the embodiment of FIGS. 9 and 10, for example, a frangible layer 75 is provided at the interface between the first layer 70 and the adhesive layer 45, as shown. In some cases, the frangible layer 75 may extend the full length between an inner edge 47 of the PSA portion 40 and an outer edge 28 of the lidding member 20, as shown in FIGS. 9 and 10, whereas in other embodiments the frangible layer 75 may extend from the inner edge 47 of the PSA portion only part of the way towards the outer edge 28, such as only to the vicinity of the break tab 25. Due to the presence of the frangible layer 75, permanent adhesive portions of the adhesive layer 45 and/or the perimeter portion 60 that join the first layer 70 to the second layer 90 will cause the layers 70, 90 to separate at the frangible layer 75 (e.g., by fracturing the frangible layer), whereas the PSA portions 40 joining the two layers 70, 90 may simply pull off the surface of the frangible layer 75, without necessarily fracturing the frangible layer or the surrounding structures.

Furthermore, in some embodiments, the lidding member 20 may comprise a cut line 22 extending through a thickness of the first layer 70 (e.g., in a direction away from the flange 15 and extending between the flange and the adhesive layer 45). The cut line 22 may be disposed outwardly of the exterior edge 14 of the flange 15 so as to define the break tab 25. The bond between the permanent adhesive of the perimeter portion 60 and the material of the first layer 70 in the area of the break tab 25 in such embodiments may be stronger than the bond between the PSA portion 40 and the corresponding portion of the first layer, such that when a user grips the break tab 25 and pulls the lidding member 20 in a direction away from the base member 10, a controlled break between the adhesive layer 45 and the first layer 70 occurs inwardly of the cut line 22, allowing the lidding member 20 to be peeled away from the base member 10. In this regard, an inward portion 71 of the first layer 70 may remain attached to the flange 15 of the base member 10, whereas the PSA portion 40 and the perimeter portion 60 (e.g., the permanent adhesive) may remain with the lidding member 20. Accordingly, the lidding member 20 may be re-sealable to the base member 10 upon re-application of the lidding member to the flange 15 of the base member to bring the PSA portion 40 back into contact with the corresponding inward portion 71 of the first layer 70. As described above with respect to FIGS. 7 and 8, one or more of the first layer 70, adhesive layer 45, ink layer 90, and/or second layer 80 may extend inwardly from the flange 15, and additional cut lines 23 may be provided as shown to ensure that the cavity is adequately opened to provide access to the items contained inside the package.

Figure 11:
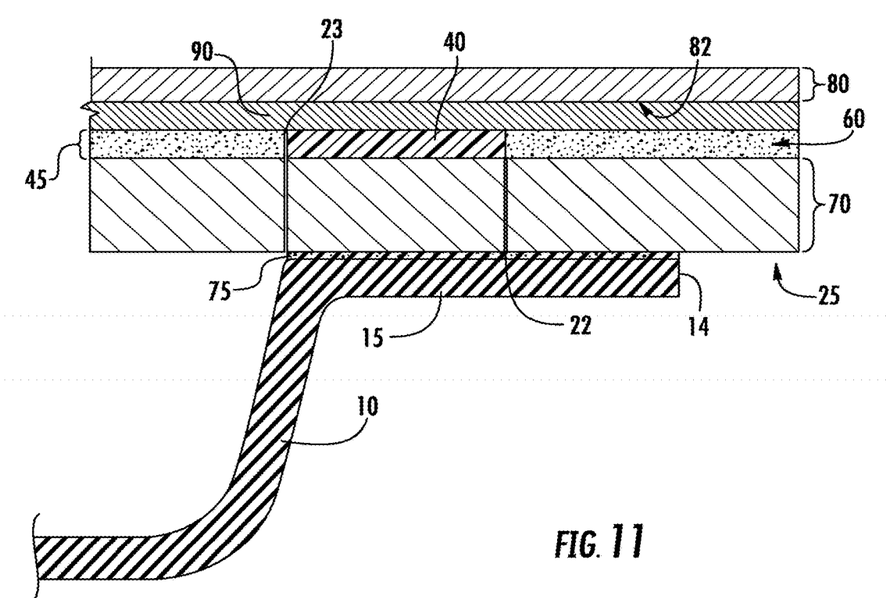
FIG. 11 is a partial schematic cross-sectional view of a lidding member with a reinforced perimeter and a base member in a closed position according to another example embodiment.
Figure 12:
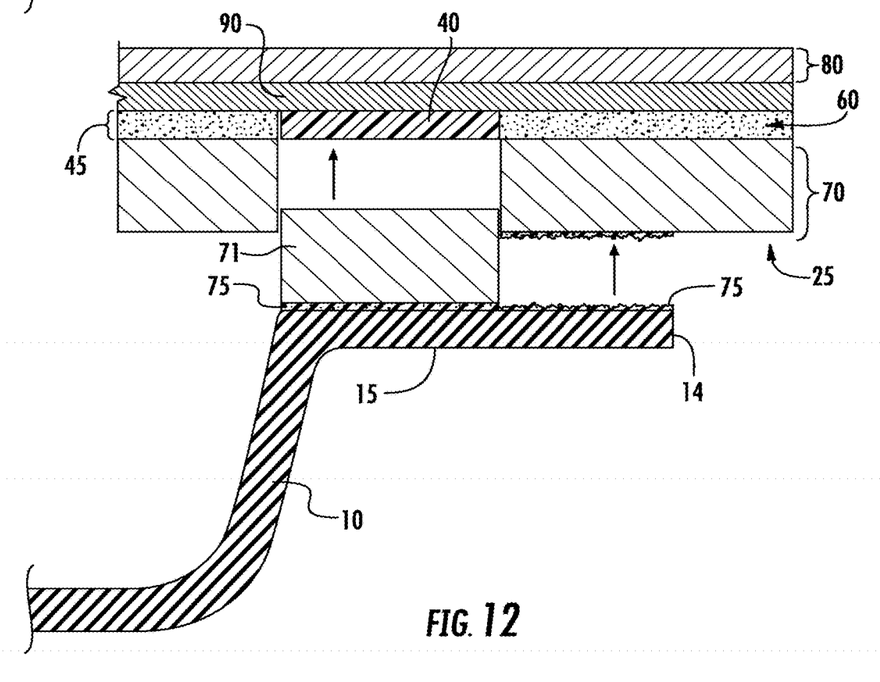
FIG. 12 is a partial schematic cross-sectional view of the lidding member with the reinforced perimeter and the base member of FIG. 11 in an open position according to an example embodiment.
Figure 13A:
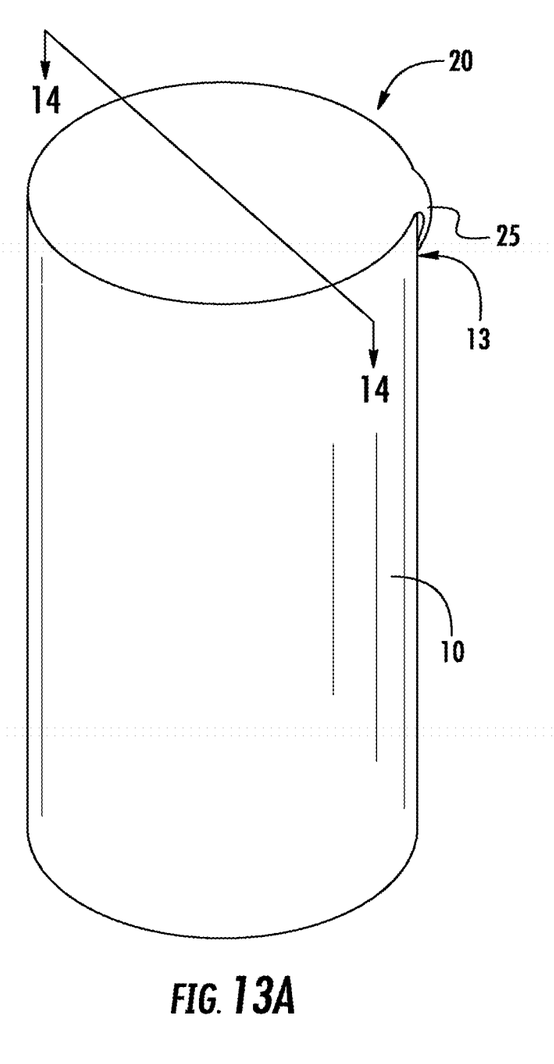
FIG. 13A is a perspective view of the package having a shaker configuration with a base member and a lidding member in the closed position according to an example embodiment.
Figure 13B:
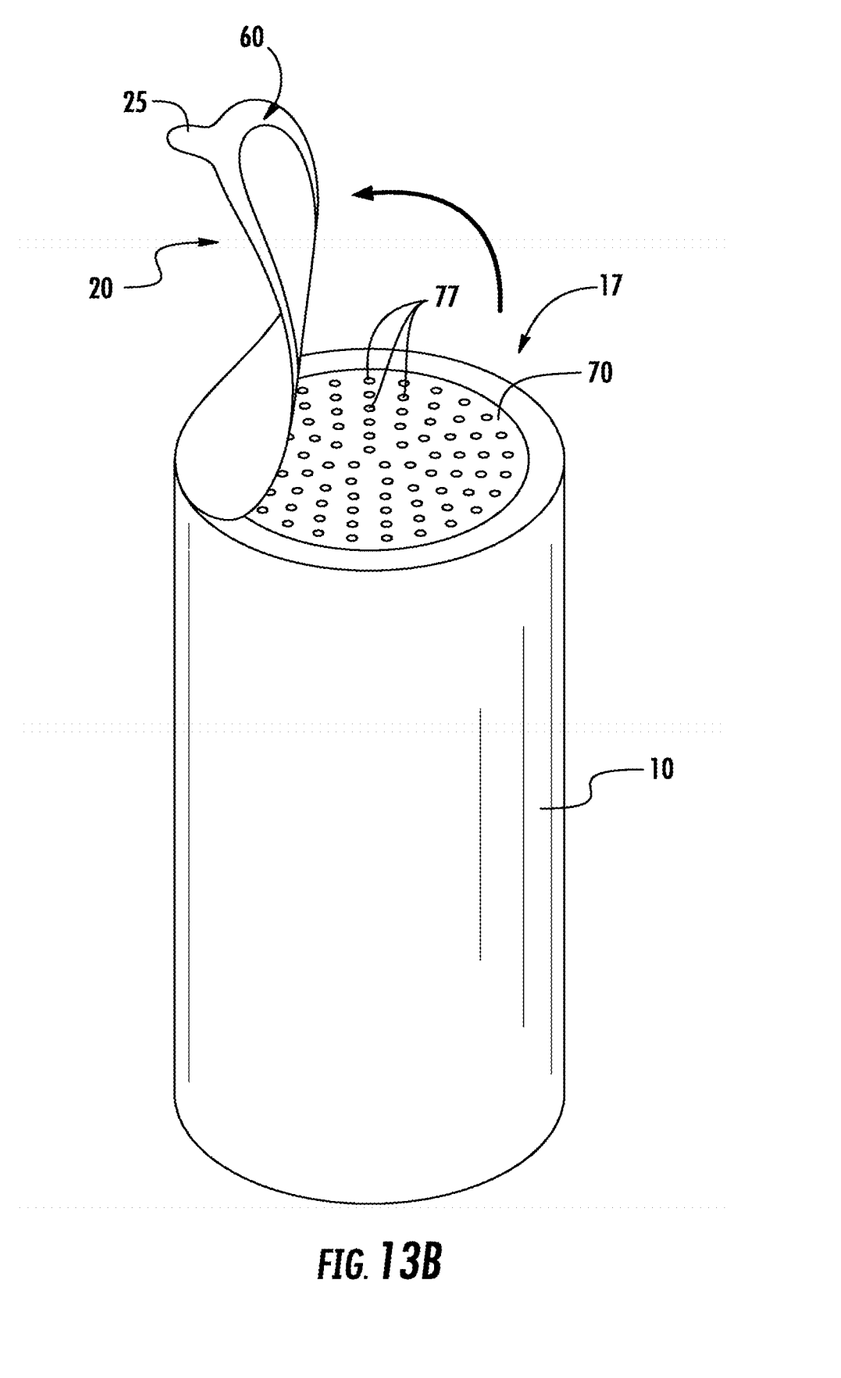
FIG. 13B is a perspective view of a package of FIG. 13A in the partially open position according to another example embodiment.

In still other embodiments, the frangible layer 75 may be disposed at an interface between the first layer 70 and the flange 15 of the base member 10, as shown in FIGS. 11 and 12, such as by creating a weakened skin layer of the flange using a method similar to that described above with respect to the first layer 70. As with the embodiment of FIGS. 9 and 10, the base member 10 may be made of a PP material, the first layer 70 may be made of CPP, and the second layer 80 may comprise polyethylene terephthalate (PET) or one or more barrier films in some embodiments. An ink layer 90 may be provided between the adhesive layer 45 and the second layer 80. The perimeter portion 60 may comprise permanent adhesive, and the lidding member 20 may comprise a cut line 22 extending through a thickness of the first layer 70 (e.g., in a direction away from the flange 15) in a location corresponding to an interface between the PSA portion 40 and the perimeter portion 60 to define the break tab 25. The cut line 22 may, for example, extend at least partially through a thickness of the first layer 70 between the base member 10 and the adhesive layer 45 (and in some embodiments may extend at least partially through the adhesive layer, such as at or near an interface between the PSA 40 and the adjacent permanent adhesive or through one or the other).

In this way, the lidding member 20 may be configured to be separable from the base member 10 at the frangible layer 75 on an outward side of the cut line 22, as depicted in FIG. 12, and at an interface disposed between the PSA portion and the first layer 70 at an inward side of the cut line. As described above with respect to the embodiment of FIGS. 9 and 10, the bond between the permanent adhesive of the perimeter portion 60 and the material of the first layer 70 in the area of the break tab 25 in such embodiments may again be stronger than the bond between the PSA portion 40 and the corresponding portion 71 of the first layer 70, such that when a user grips the break tab 25 and pulls the lidding member 20 in a direction away from the base member 10, a controlled break between the adhesive layer 45 and the first layer 70 occurs inwardly of the cut line 22 and between the first layer 70 and the flange 15 outwardly of the cut line 22, thereby allowing the lidding member 20 to be peeled away from the base member 10. In this regard, an inward portion 71 of the first layer 70 may remain attached to the flange 15 of the base member 10, whereas the PSA 40 and the perimeter portion 60 (e.g., the permanent adhesive) may remain with the lidding member 20. Accordingly, the lidding member 20 may be re-sealable to the base member 10 upon re-application of the lidding member to the flange 15 of the base member to bring the PSA 40 back into contact with the corresponding inward portion 71 of the first layer 70. As with the embodiments described above, additional cut lines 23 may be provided in portions of the lidding member inward of the portions shown to facilitate opening of the package Aspects of the embodiments described above with respect to FIGS. 7-12 may, in some cases, be applied to other types of packages that do not include a base member configured in the shape of a tub. Turning to FIGS. 13A-15, for example, a cylindrical shaker-type of package may be provided that incorporates a perimeter portion for preventing or reducing the occurrence of leaks (into or out of the package) as described above with respect to other embodiments.

In the embodiment shown in FIGS. 13A-15, for example, the base member 10 comprises a cylindrical container, which may be a composite can with a polymer (e.g., PP) sealant or an injection molded PP container. The lidding member 20 in the depicted embodiment may be configured such that when peeled away from the base member 10, at least a portion of the first layer 70 of the lidding member remains attached to and covers the opened end 17 of the cylindrical container. In such embodiments, the first layer 70 may define holes 77, such that the package can be used as a strainer or shaker (e.g., for dispensing the contents of the package by inverting the package after peeling away the lidding member and allowing the contents to fall out via the holes), as described in greater detail below.

Figure 14:
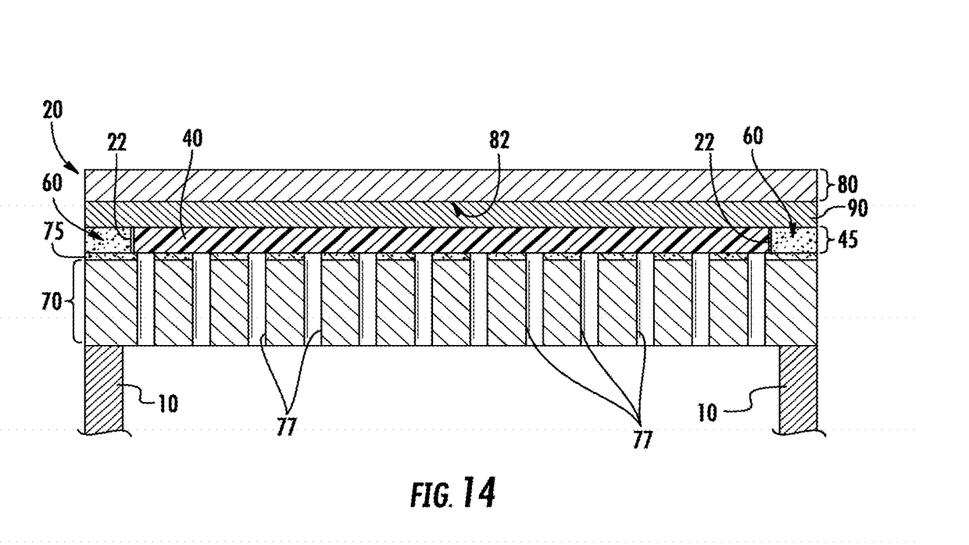
FIG. 14 is a partial schematic cross-sectional view of the lidding member with the reinforced perimeter and the base member of FIGS. 13A and 13B in the closed position according to another example embodiment.
Figure 15:
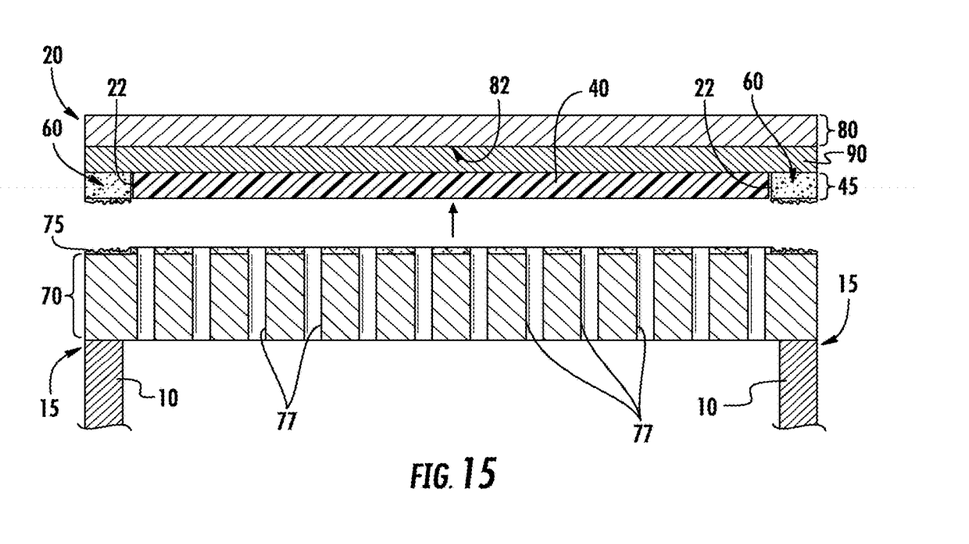
FIG. 15 is a partial schematic cross-sectional view of the lidding member with the reinforced perimeter and the base member of FIGS. 13A and 13B in the open position according to an example embodiment.

With reference to FIGS. 14 and 15, for example, the first layer 70 (which may be made of CPP in some embodiments) may be attached (e.g., via heat sealing as described above) to a rim or flange 15 of the cylindrical base member 10, as shown. The first layer 70 may have holes 77 cut through a thickness of the film to allow product to be dispensed upon opening of the package. A frangible layer 75 may be provided in the material of the first layer 70 at an interface between the first layer 70 and an adhesive layer 45, where the adhesive layer 45 includes an area of PSA 40 (e.g., in a central region corresponding to the location of the holes 77 defined in the first layer 70).

As described above with respect to the embodiment of FIGS. 9-12, the perimeter portion 60 in the embodiment depicted in FIGS. 13A-15 may, in some cases, comprise a permanent adhesive. Thus, the permanent adhesive forming the perimeter portion 60 may be in the shape of a ring when the package is viewed from the top. Furthermore, in some embodiments, an ink layer 90 may be applied to an inner surface 82 of the second layer 80, where the second layer 80 is made of PET material or a barrier film. In still other embodiments, the second layer 80 may comprise a laminate film (not shown) that has more than one film layers laminated together. For example, the second layer 80 may comprise an oxygen barrier film that is laminated to a moisture barrier film.

When the lidding member 20 is peeled away from the base member 10, such as via a user pulling on a break tab 25 (FIG. 13A), the adhesion between the permanent adhesive of the perimeter portion 60 and the frangible layer 75 may serve to cause a failure of the frangible layer in those locations that are adhered to the permanent adhesive. In other portions of the lidding member 20, such as where the PSA portion 40 is adhered to the frangible layer 75, the adhesive layer 45, ink layer 90, and second layer 80 may be peeled off the first layer 70 due to the low adhesive strength of the PSA to the frangible layer and/or underlying material of the first layer, as shown in FIG. 15. Thus, by peeling the lidding member 20 away from the base member 10, the holes 77 in the first layer 10 may be exposed, and product can be dispensed from the package. To facilitate the proper peeling of the lidding member, cut lines 22 may be provided in the adhesive layer, such as a cut line formed between the perimeter portion 60 and the PSA portion 40.

In any of the embodiments pictured in FIGS. 7-15 and described above, one or more additional packaging features may be used in conjunction with those described above. For example, tamper evident features may be provided to allow a consumer to visually identify whether a package has been previously opened. With respect to the embodiment of FIGS. 13A-15, for example, the break tab 25 may initially be tacked on (e.g., via glue) to an outer surface 13 of the base member 10, as shown in FIG. 13B. A user opening the package for the first time would pull the break tab 25 to detach it from the outer surface 13 and continue peeling the lidding member 20 away from the base member 10 to open the package. Once opened, although the lidding member 20 may be re-attachable to the base member 10 via the PSA 40, the detached state of the break tab 25 would serve as a visual indication that the original seal on the package has been broken.

In addition to the different embodiments of packages described above with respect to FIGS. 7-15, embodiments of a method of manufacturing a flexible package are also provided. Embodiments of the method include forming a base member having a cavity configured to receive an item therein and a flange, where the flange defines an exterior edge. A first layer of material may be laminated to a second layer of material to form a lidding member that is attached to the base member to form the package. For example, the lidding member may be formed by applying a pressure sensitive adhesive between the first and the second layers and creating a perimeter portion between the first and second layers that is disposed adjacent to an outer edge of the pressure sensitive adhesive, such that the pressure sensitive adhesive is spaced inwardly from the exterior edge of the flange.

In some cases, the lidding member may be attached to the base member at a location corresponding to the perimeter portion, such that the lidding member covers the cavity and maintains the item within the base member. At least a portion of the lidding member may be configured to be peeled away from the base member to provide access to the cavity and may be further configured to be re-sealed to the base member via the pressure sensitive adhesive, as described above.

In some embodiments, a cut line may be created through a thickness of at least the first layer prior to attaching the lidding member to the base member. The cut line may define a break tab outwardly of the cut line that is grippable by a user for peeling the lidding member away from the base member to provide access to the cavity, as described above.

As provided in detail above, the perimeter portion may be created in various ways depending on the materials involved, the types of packages being made and their proposed uses, etc. The perimeter portion may, for example, be created by forming a region of increased thickness of the first layer, such as using a polyethylene emulsion. The cut line may be created between the pressure sensitive adhesive and the perimeter portion, such that the lidding member separates from the base member at an interface disposed between the first layer and the base member on an outward side of the cut line and at an interface disposed between the pressure sensitive adhesive and the first layer at an inward side of the cut line.

In other cases, the perimeter portion may be created by applying permanent adhesive to a perimetral region of the first layer such that the permanent adhesive is disposed adjacent to the outer edge of the pressure sensitive adhesive. A frangible layer may be created between the adhesive layer and the first layer, and the cut line may extend through a thickness of the first layer outwardly of the exterior edge of the flange so as to define the break tab.

In other embodiments, a frangible layer may be created between the first layer and the flange of the base member, and the cut line may extend through a thickness of the first layer in a location corresponding to an interface between the pressure sensitive adhesive and the perimeter portion, such that the lidding member is separable from the base member at the frangible layer on an outward side of the cut line and at an interface disposed between the pressure sensitive adhesive and the first layer at an inward side of the cut line.

An ink layer may, in some cases, be applied on an inner surface of the second layer between the pressure sensitive adhesive and the second layer. Moreover, the lidding member may be heat sealed to the base member in a location corresponding to the perimeter portion to attach the lidding member to the base member.

Embodiments of the package are described above having different materials and, in some cases, different structures and methods of forming the perimeter portion. Although some such structures and features are described with respect to a particular embodiment, it is understood that various combinations of the features may be applied to other embodiments described herein. For example, each of the embodiments of FIGS. 7-15 may configured to include a tamper evident feature, such as the tamper evident feature described with respect to FIGS. 13A-15. In addition, as noted above, some of the figures described above have been simplified for purposes of explanation, such that not all portions of the components, including portions of the base member, first and second layers of the lidding member, die cuts, adhesive layers, etc. are shown. It is understood that portions of these components may be configured to impart additional desirable qualities to the package, such as to facilitate opening and closure of the package, re-sealability, barrier properties, etc.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A flexible package comprising:
   a base member defining a cavity configured to receive an item therein, the base member comprising a flange, wherein the flange defines and exterior edge; and a lidding member configured to be attached to the base member to cover the cavity and maintain the item within the base member, wherein the lidding member is configured to be peeled away from the base member to provide access to the cavity and is configured to be resealed to the base member, wherein the lidding member comprises:
  a first layer configured to engage the flange of the base member and extending at least to the exterior edge of the flange,
  a second layer laminated to the first layer via an adhesive layer, wherein the adhesive layer comprises
    a pressure sensitive adhesive in a first portion spaced inwardly from the exterior edge of the flange,
    a permanent adhesive in a perimeter portion adjacent an outer edge of the pressure sensitive adhesive, and
  a frangible layer between the first layer and the adhesive layer in at least the perimeter portion,
  wherein the frangible layer is configured to fracture laterally through at least a portion of its thickness in the perimeter portion when at least a portion of the lidding member is peeled away from the base member, and
  wherein the pressure sensitive adhesive is configured to separate from the at least the first layer when at least a portion of the lidding member is peeled away from the base member.

2. The flexible package of claim 1, wherein the first layer and the perimeter portion extend outwardly past the outward edge of the flange of the base member and define a break tab.

3. The flexible package of claim 1, wherein the lidding member comprises a cut line extending through a thickness of the first layer outwardly of the outer edge of the flange so as to define a break tab.

4. The flexible package of claim 1, additionally comprising an ink layer disposed between the second layer and the adhesive layer.

5. The flexible package of claim 1, wherein the adhesive layer comprises permanent adhesive disposed adjacent an inner edge of the pressure sensitive adhesive.

6. The flexible package of claim 1, wherein the frangible layer extends the width of the lidding member.

7. The flexible package of claim 6, wherein a cut line is disposed adjacent an inner edge of the pressure sensitive adhesive and wherein said cut line extends through at least the first layer, the frangible layer, and the adhesive layer.

8. The flexible package of claim 6, wherein the pressure sensitive adhesive is configured such that it separates from the frangible layer when at least a portion of the lidding member is peeled away from the base member.

9. The flexible package of claim 6, wherein the frangible layer is configured to fracture laterally through at least a portion of its thickness in only the perimeter portion.

10. The flexible package of claim 1, wherein the frangible layer comprises a weakened skin layer of the first layer of the lidding member.

11. The flexible package of claim 10, wherein the skin layer comprises a coextrudable sealant film of a weakened heat seal coating.

12. The flexible package of claim 1, wherein the bond between the permanent adhesive of the perimeter portion and the frangible layer is stronger than the bond between the pressure sensitive adhesive and the frangible layer.

13. The flexible package of claim 1, wherein the fracture comprises a controlled break.

14. The flexible package of claim 1, wherein the frangible layer is configured such that at least a portion of the frangible layer remains affixed to the first layer and a portion of the frangible layer remains affixed to the permanent adhesive when the lidding member is peeled away from the base member.

15. The flexible package of claim 1, wherein the first layer remains affixed to the base member and covers the cavity portion of the package when the lidding member is peeled away from the base member and wherein the first layer comprises through holes through which contents of the package may be dispensed.

16. The flexible package of claim 15, wherein the frangible layer is disposed throughout a central region of lidding member other than in the locations of the through holes defined in the first layer.

17. The flexible package of claim 16, wherein pressure sensitive adhesive is disposed throughout the central region of the lidding member.

18. A method of manufacturing a flexible package, the method comprising:
  providing a base member having a cavity configured to receive an item therein and a flange, wherein the flange defines an exterior edge;
  create a lidding member by:
    providing a first layer of material and a second layer of material;
    providing a frangible layer attached to the first layer, disposed in at least a perimeter portion of the lidding member;
    laminating the frangible layer to the second layer by:
      applying a pressure sensitive adhesive between the first and second layers, wherein the pressure sensitive adhesive is applied inwardly of the exterior edge of the flange, and
      applying a permanent adhesive between the first and second layers adjacent an outer edge of the pressure sensitive adhesive in the perimeter portion; and
  attaching the lidding member to the base member at a location corresponding to the perimeter portion, such that the lidding member covers the cavity and maintains the item within the base member, wherein at least a portion of the lidding member is configured to be peeled away from the base member to provide access to the cavity and is configured to be resealed to the base member via the pressure sensitive adhesive.

19. The method of claim 18, further comprising creating a cut line through a thickness of at least the first layer prior to attaching the lidding member to the base member, wherein the cut line defines a break tab outwardly of the cut line that is grippable by a user for peeling the lidding member away from the base member to provide access to the cavity.

20. The method of claim 18, further comprising creating a cut line between at least the pressure sensitive adhesive and the permanent adhesive in the perimeter portion, such that the lidding member fractures within the frangible layer on an outward side of the cut line and the pressure sensitive adhesive separates from the frangible layer at an interface disposed at an inward side of the cut line.

21. The method of claim 20, wherein the cut line extends through the adhesive layer and the frangible layer.

22. The method of claim 18, wherein creating the perimeter portion comprises applying permanent adhesive to a perimetral region of the frangible layer such that the permanent adhesive is disposed adjacent to the outer edge of the pressure sensitive adhesive.

23. The method of claim 18, further comprising applying an ink layer on an inner surface of the second layer.

24. The method of claim 18, further comprising heat sealing the lidding member to the base member in a location corresponding to the perimeter portion.

* * * * *